3,306,885
MOLECULAR WEIGHT CONTROL IN POLYMERIZATION OF VINYLIDENE MONOMERS USING A 1,2-CARBOXY-5-METHYLCYCLOHEXENE-4 REGULATOR
Speros P. Nemphos, Springfield, Mass., and Richard Emile Delacretaz, Cincinnati, Ohio, assignors to Monsanto Company, St. Louis, Mo., a corporation of Delaware
No Drawing. Filed Feb. 25, 1966, Ser. No. 529,925
4 Claims. (Cl. 260—85.5)

This application is a continuation-in-part of our copending application Serial No. 368,390, filed May 18, 1964, now abandoned, which was a continuation-in-part of application Serial No. 136,995, filed September 11, 1961, also now abandoned.

The invention relates to the polymerization of a free radical polymerizable material including a polar monomer and more particularly relates to a method of regulating the molecular weights of polymers prepared by polymerizing such a free radical polymerizable material in the absence of an organic diluent.

The tendency of certain free radical polymerizable materials to polymerize to very high molecular weight polymers under normal polymerization conditions is already well known. These very high molecular weight polymers have the disadvantage of being difficult to process; i.e., unable to be processed without the use of special processing equipment except at temperatures so high as to have a detrimental effect on the strength and color of the processed polymers.

Various techniques have been proposed for regulating the molecular weights of such polymers so as to make them more easy to process. One of these techniques is to conduct the polymerization in an organic diluent. This technique is effective as a means of lowering molecular weight, but it has the disadvantages of increased cost and inconvenience of separating the polymer from the organic diluent. Other proposed techniques avoid the disadvantages of solvent polymerization but have unfortunate disadvantages of their own, e.g., raising the polymerization temperature increases the danger of a runaway polymerization, and using a mercaptan as a chain transfer agent contributes a very unpleasant odor to the polymers.

An object of the invention is to provide more easily processed polymers of the type prepared by polymerizing a free radical polymerizable material including a polar monomer.

Another object is to provide a novel process for regulating the molecular weights of such polymers without employing an organic diluent in the polymerization reaction mixture.

These and other objects are attained by conducting the polymerization of a free radical polymerizable material consisting essentially of 90.0 to 10.0 percent by weight of at least one monovinylidene aromatic hydrocarbon and 10.0 to 90.0 percent by weight of a nitrile selected from the group consisting of acrylonitrile and methacrylonitrile, in the absence of an organic diluent and in the presence of a free radical polymerization initiator and 0.05 to 5.0 percent by weight of 1,2-dicarboxy-5-methylcyclohexene-4, based upon the free radical polymerizable material.

The following examples are given to illustrate the invention and are not intended as a limitation thereof. Unless otherwise specified, quantities mentioned are quantities by weight.

EXAMPLE 1

Control

Charge a solution of 2.0 parts by weight of sodium stearate in 150.0 parts of water to a suitable reaction vessel and heat to 95.0 to 100.0° centigrade with agitation. Continuously add a mixture of 80.0 parts of styrene and 20.0 parts of acrylonitrile to the heated, agitated soap solution over a period of two hours. During the addition of the monomer mixture, continuously add a separate charge consisting of a solution of 0.25 part of potassium persulfate in 50.0 parts of water. After completing the addition of the monomer and catalyst charges, strip the emulsion of unreacted monomers, coagulate and dry. The polymeric product has a specific viscosity of 0.180, measured as a solution of 0.1 percent of the polymer in dimethylformamide.

EXAMPLE 2

Repeat Example 1 except for adding 2.0 parts of 1,2-dicarboxy-5-methylcyclohexene-4 together with the monomer charge. The product has a specific viscosity of 0.152, measured as a solution of 0.1 percent of the polymer in dimethylformamide.

As demonstrated above, the addition of 2.0 parts of 1,2-dicarboxy-5-methylcyclohexene-4 to 100.0 parts of the monomer charge in the emulsion copolymerization of styrene and acrylonitrile results in decreasing the molecular weight of the product. Similar results are observed when 0.05 to 5.0 parts of 1,2-dicarboxy-5-methylcyclohexene-4 are added to 100.0 parts of the monomer charge in:

(1) The suspension copolymerization of 70.0 parts of styrene and 30.0 parts of acrylonitrile at a time-temperature cycle of four hours at 125.0° centigrade and four hours at 140.0° centigrade.

(2) The emulsion terpolymerization of 60.0 parts of styrene, 20.0 parts of acrylonitrile, and 20.0 parts of dibutyl fumarate at 95.0 to 100.0° centigrade.

(3) The emulsion terpolymerization of 45.0 parts of styrene, 35.0 parts of alpha-methylstyrene, and 20.0 parts of acrylonitrile at 95.0 to 100.0° centigrade.

The larger concentrations of 1,2-dicarboxy-5-methylcyclohexene-4 cause the greater reductions in the molecular weights of the products.

The invention is a method of regulating the molecular weights of polymers prepared from a free radical polymerizable material including a polar monomer without employing an organic diluent. The molecular weight regulation is achieved by conducting the polymerization of the free radical polymerizable material in the presence of a minor amount of 1,2-dicarboxy-5-methylcyclohexene-4.

The amount of molecular weight regulator employed in the practice of the invention is in the range of 0.05 to 5.0 percent, usually 0.1 to 3.0 percent, based on the weight of the free radical polymerizable material. 1,2-dicarboxy-5-methylcyclohexene-4 is ineffective as a molecular weight regulator at concentrations lower than 0.05 percent. Concentrations higher than 5.0 percent are usually undesirable, either because the higher concentration causes too great a reduction of the molecular weight of the polymer or because the amount of molecular weight regulator which becomes chemically combined into the polymer is large enough to noticeably affect polymer properties other than the properties attributable to molecular weight. A particular advantage of the molecular weight regulator of the invention is its ability to act as a molecular weight regulator at such low concentrations that substantially its only contribution to the properties of the polymers prepared in its presence is an improvement in processability.

The free radical polymerizable materials which are polymerized in the presence of the molecular weight regulator of this invention consist essentially of at least 90.0 to 10.0 percent by weight of one monovinylidene aromatic hydrocarbon and 10.0 to 90.0 percent by weight of a nitrile selected from the group consisting of acrylonitrile and methacrylonitrile. It will be appreciated that minor amounts of other monomers may be interpolymerized with these two essential monomers and that the polymerization may be conducted in the presence of a preformed polymer as in the production of a graft copolymer.

Suitable copolymerizable monomers which may be included in the polymerizable formulation are alkyl acrylates, such as methyl acrylate, ethyl acrylate, butyl acrylate, 2-ethylhexyl acrylate, dodecyl acrylate, etc.; alkyl methacrylates, such as methyl methacrylate, butyl methacrylate, etc.; dialkyl maleates, such as dibutyl maleate; dialkyl fumarates, such as dibutyl fumarate; acrylic acid, methacrylic acid, conjugated dienes, such as butadiene.

The monovinylidene aromatic hydrocarbon may be any of those conventionally employed, such as styrene, alpha-methylstyrene, alpha-ethylstyrene, o-, m-, and p-methylstyrenes, o-, m-, and p-methyl-alpha-methylstyrenes, p-isopropylstyrene, ar-dibutylstyrenes, vinyl naphthalene, etc.

As previously indicated, it is within the scope of the present invention to conduct the polymerization of the monomers in the presence of a preformed polymer such as polybutadiene or a rubbery butadiene-styrene copolymer, or the like, to graft polymeric chains of the free radical polymerizable material onto the preformed polymer backbone. The molecular weight regulator serves to shorten the chains grafted onto the polymer backbone as well as to lower the molecular weight of any coformed, ungrafted polymer of the free radical polymerizable material.

The polymerization of the free radical polymerizable material in the presence of the molecular weight regulator of the invention may be accomplished by any of the mass, suspension, or emulsion polymerization techniques conventionally employed for the polymerization of such materials, usually at temperatures in the range of 30.0 to 200.0° centigrade at atmospheric or superatmospheric pressure. The reaction mixture should contain a free radical polymerization initiator, such as a peroxy or azo compound, and any ingredient required by the particular polymerization technique employed; e.g., water, an emulsifying agent, a suspending agent, etc. Optional ingredients, such as antioxidants, plasticizers, etc., can also be included in the reaction mixture if desired.

A preferred embodiment of the invention is the use of the molecular weight regulator in polymerization reactions which are conducted in an aqueous medium. Ordinarily in such reactions, the weight ratio of water to free radical polymerizable material is in the range of 9:1 to 2:3. The emulsifying agent, when employed, can be of the anionic, cationic, or nonionic type; the suspending agent, when employed, can be inorganic or organic.

The products of the invention are polymers which contain a minor amount of chemically combined molecular weight regulator and have lower molecular weights than the corresponding polymers prepared in the absence of the molecular weight regulator. Because of their lower molecular weights, they are more easily processable and can be processed, e.g., extruded, molded, etc., in conventional processing equipment without requiring the use of extreme temperatures which would have a detrimental effect on the strength and color of the products.

The invention is particularly advantageous in that it accomplishes molecular weight regulation without the aid of organic diluents, malodorous mercaptans, or reactive materials which would have to be used in such large amounts as to have a noticeable effect on other polymer properties as well as on processability.

It is obvious that many variations can be made in the products and processes set forth above without departing from the spirit and scope of this invention.

What is claimed is:

1. In a process for polymerizing a free radical polymerizable material consisting essentially of 90.0 to 10.0 percent by weight of at least one monovinylidene aromatic hydrocarbon and 10.0 to 90.0 percent by weight of a nitrile selected from the group consisting of acrylonitrile and methacrylonitrile in the presence of a free radical polymerization initiator, the improvement which comprises conducting the polymerization in the presence of 0.05 to 5.0 percent of 1,2-dicarboxy-5-methylcyclohexene-4, based on the weight of the free radical polymerizable material.

2. The process of claim 1 wherein the nitrile is acrylonitrile.

3. The process of claim 2 wherein the monovinylidene aromatic hydrocarbon is styrene.

4. The process of claim 1 wherein the polymerization is conducted in an aqueous medium.

References Cited by the Examiner
UNITED STATES PATENTS

| | | | |
|---|---|---|---|
| 2,979,480 | 4/1961 | Piloni et al. | 260—41 |
| 3,179,721 | 4/1965 | Herbig et al. | 260—85 |

JOSEPH L. SCHOFER, *Primary Examiner.*

JAMES A. SEIDLECK, *Examiner.*

H. WONG, *Assistant Examiner.*